United States Patent
Smeltzer, III et al.

(10) Patent No.: US 6,672,593 B2
(45) Date of Patent: Jan. 6, 2004

(54) VARIABLE PRESSURE WASHER

(75) Inventors: Stanley S. Smeltzer, III, Smithfield, VA (US); Hector Estrada, Corpus Christi, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 59 days.

(21) Appl. No.: 10/028,297

(22) Filed: Dec. 20, 2001

(65) Prior Publication Data

US 2003/0116922 A1 Jun. 26, 2003

(51) Int. Cl.$^7$ ................................................ F16J 15/16
(52) U.S. Cl. ......................... 277/578; 411/542; 220/582
(58) Field of Search ..................... 277/578, 579, 277/377, 379, 385, 634; 220/582; 411/542, 544, 149, 150; 384/420

(56) References Cited

U.S. PATENT DOCUMENTS

| | | | | |
|---|---|---|---|---|
| 4,280,601 A | * | 7/1981 | Patriquin | 188/316 |
| 4,571,133 A | * | 2/1986 | Lindow | 411/11 |
| 4,690,365 A | * | 9/1987 | Miller et al. | 248/650 |
| 4,967,599 A | * | 11/1990 | Donguy | 60/770 |
| 5,180,268 A | * | 1/1993 | Richardson | 411/536 |
| 5,287,988 A | * | 2/1994 | Murray | 220/589 |
| 5,429,845 A | * | 7/1995 | Newhouse et al. | 428/34.1 |
| 5,709,516 A | * | 1/1998 | Peterson et al. | 411/544 |
| 6,186,356 B1 | * | 2/2001 | Berkley et al. | 220/582 |

* cited by examiner

*Primary Examiner*—William L. Miller
(74) *Attorney, Agent, or Firm*—James J. McGroary; Alan Ruderman

(57) ABSTRACT

A variable pressure washer has two interlocking channel rings separated by a channel and retained by a captive set of fasteners. Within the channel between the rings are multiple rows of springs having at least two different spring moduli. The washer is particularly suited for use with a polar boss assembly secured to a bulkhead of a pressure vessel such as of propellent tank dome structure where the washer allows for the substantially uniform deflection of multiple O-rings as affected by the curved structure.

19 Claims, 1 Drawing Sheet

VARIABLE PRESSURE WASHER

ORIGIN OF THE INVENTION

This invention was made by an employee of the United States Government together with government support under contract awarded by the National Aeronautics and Space Administration and may be manufactured and used by or for the Government for governmental purposes without the payment of any royalties thereon or thereof.

BACKGROUND OF THE INVENTION

1. Field of the Invention

This invention relates to a washer apparatus designed to apply a specified varying load along different radians of a washer for a given deflection, and more specifically to a washer adapted to seal with a non-parallel surface.

2. Prior Art

Although a plurality of seals and washers are known in the art which are adapted to seal planar, parallel members, there is not known to be any effort made to seal a curved member to a planar member. Specifically, when a curved surface such as a dome is equipped with a polar boss, or a seal along an opening of the curved surface, additional force is necessary on an outer portion of the seal than on the inner portion of the seal to achieve equal O-ring compression. A need exists to provide a washer or seal design that can provide relatively equal force along a curved surface.

SUMMARY OF THE INVENTION

Consequently, it is a primary object of the present invention to apply a specified varying load along a radian for each cross section of a circumference of a washer.

It is a further object of the present invention to provide a washer to deploy a seal wherein the seal transfers a uniform load from one surface to a linearly varying load on another surface.

Another object of the present invention is to provide a washer adapted to provide relatively constant force along an external surface when one surface of the washer contacts a curved surface.

Accordingly, the present invention provides a variable pressure washer having two interlocking rings, preferable channel rings defining a channel there between. A captive set of fasteners may be utilized to prevent the channel rings from coming apart. In the preferred embodiment, a plunger moving within a plunger housing acts as the captive fastener set and determines the range of movement of the channel rings relative to one another. Within the channel between the rings are at least two compressible springs which exhibit different characteristics, specifically, differing stiffness or spring modulus values. The springs are preferably devices such as metallic springs, thermoplastic rings, etc. . . . Retaining members, such as cups, may be utilized to locate the springs in a desired position within the rings.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
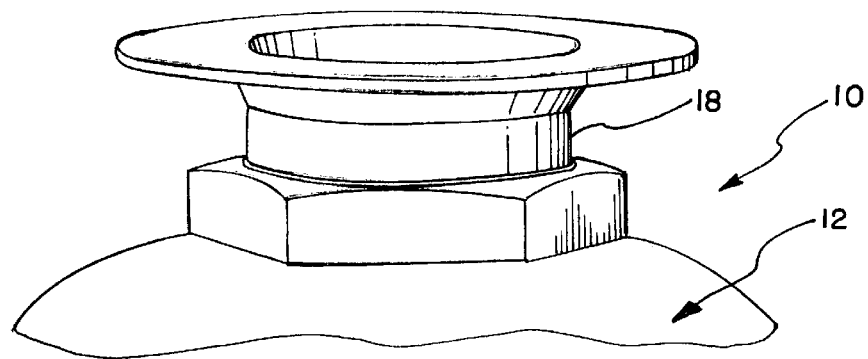
FIG. 1 is a top perspective view of a polar boss assembly mounted to a bulkhead.

Referring to the FIG. 1, a polar boss assembly 10 is illustrated in FIG. 1 connected to a bulkhead illustrated as dome 12. In the preferred embodiment, the assembly 10 is a polar boss joint assembly sealed to a composite dome. However, various other applications are believed to exist.

The assembly 10 may be utilized to provide a low leakage seal to allow for the passage of material into domes 12, such as fiber reinforced plastic composite domes. The polar boss assembly 10 comprises a first clamping surface 14 which is obscured from view in FIG. 1, but visible in the cross sectional view of FIG. 2. The first clamping surface 14 is located on stationary arm 16 which connects to assembly shaft 18. The shaft 18 connects to the arm 16 and cooperates with the moving arm 20 to clamp the dome 12 between the moving arm 20 and the stationary arm 16.

Figure 2:
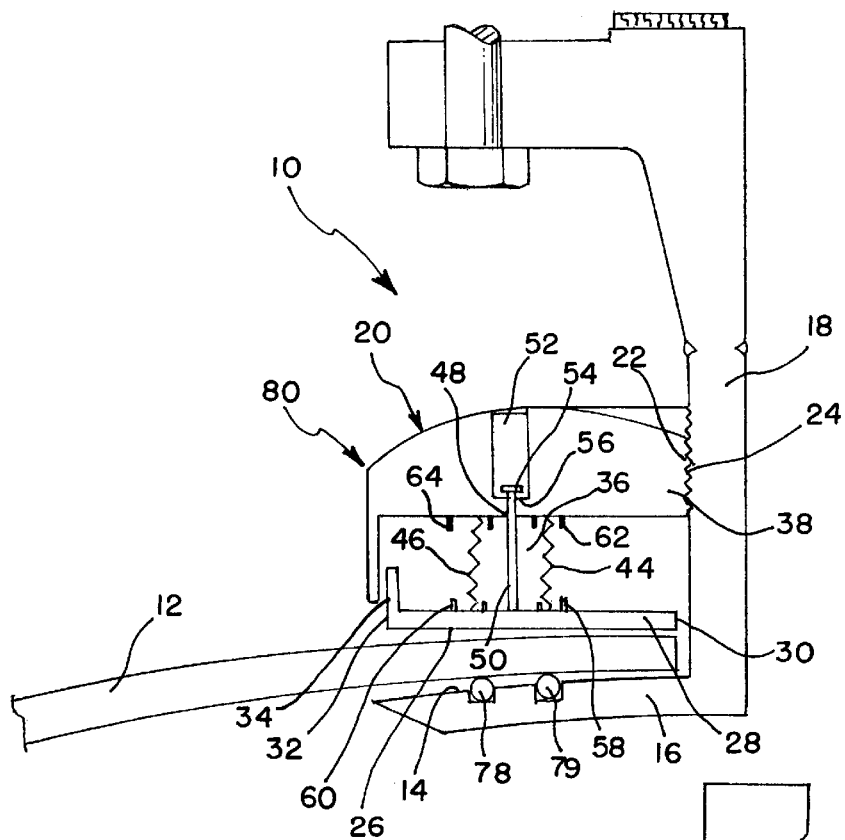
FIG. 2 is a cross sectional view of the polar boss assembly of FIG. 1.

In the preferred embodiment of FIGS. 1 and 2, the moving arm 20 has threads 22 which cooperate with threads 24 on the shaft 18 whereby rotation of the moving arm 20 relative to the shaft 18 displaces the moving arm 20 towards and away from the stationary arm 16. A second clamping surface 26 contacts the top of the dome 12 when the dome is secured to the boss assembly 10. The first clamping surface 14 contacts the bottom of the dome 12 when the boss assembly 10 is secured to the dome 12.

The second clamping surface 26 is located on a bottom portion of a ring 28, preferably a ring 28 with a lip 34 as illustrated in FIG. 2. The ring 28 is illustrated having an inner edge 30 which would define an inner radius about a center of the ring 28, and an outer edge 32 which would define an outer radius about a center of the ring 28. Lip 34 of the ring 28 assists in defining a channel 36 between the first ring 28 and second ring 38 which, in this embodiment, is a portion of the moveable arm 20. In the alternatively preferred embodiment, washer 82, illustrated in FIG. 3, the second ring 40 is separate from the moveable arm 42.

Referring back to FIG. 2, two variable stiffness, deformable members described as first and second springs 44, 46 are illustrated as a part of washer 80. Of course, more springs 44,46 could be utilized if so desired. The first spring 44 has a first spring modulus, while the second spring 46 has a second spring modulus. The second spring modulus is greater than the first spring modulus. Using a simple mechanics formula, Force=Kx where x is the spring deflection and K is the spring modulus, one can quickly see that if the force is maintained constant, then for two different springs 44, 46 having two different spring moduli, the deflection of the springs will be different. Accordingly, if the spring modulus is greater for the second spring 46 than for the first spring 44, the deflection will not be as great for the same force transmitted across both springs. This is the physics behind the washer 80 of FIG. 2 and the washer 82 of FIG. 3. Of course, more springs 44,46 could be utilized with other spring moduli depending on the expected positions of the springs in a deflected position to accommodate a nonparallel surface to at least one of the gripping surfaces 26,14 so that a uniform load could be placed on the non-parallel surface. In another embodiment, the first ring 28 of the washer 80 is not a continuous circular member. This embodiment provides for an arc-length split in ring 28 or for a section of ring 28 to overlap. This discontinuity feature would allow the outer edge 32 of ring 28 to move in a direction perpendicular to the face of the dome 12 while the inner edge 30 remained stationary. This would cause the flat washer-like geometry of ring 28 to deform into the shape of a truncated cone in order to match the geometry of the dome 12 and maintain pressure along the dome surface.

In order to retain the first ring 28 relative to the second ring 38, a captive fastener device 48 is utilized. The captive fastener device 48 of the preferred embodiment includes a plunger 50 and a plunger housing 52. The plunger housing 52 allows the plunger 50 to move until the first ring 28 is a maximum distance from the first ring 38 and then prevents the first ring 28 from moving any farther away from the second ring 38. The plunger 50 is connected to the first ring 28 and has a plunger head 54 which contacts a shelf 56 to prevent further outward travel of the first ring 28 relative to the second ring 38.

First and second retaining members 58, 60 are preferably utilized to locate, or retain, the first and second springs 44,46 relative to the first ring 28. Third and fourth retaining members 62,64 retain the first and second springs 44,46 relative to the second ring 38. The retaining members 58,60,62,64 are preferably cup shaped and extend about a radian of the ring to which they are connected.

Figure 3:
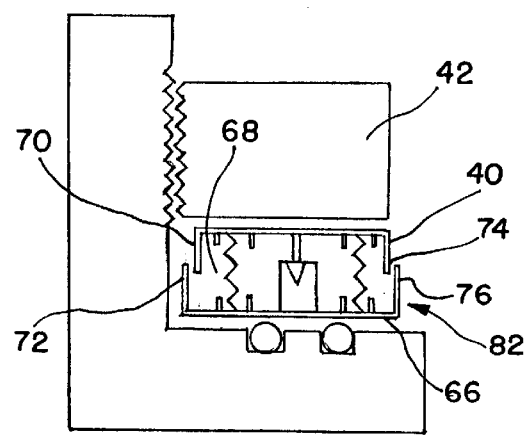
FIG. 3 is a cross sectional view of an alternative embodiment of the polar boss assembly of FIG. 1.

Referring to FIG. 3, the alternatively preferred embodiment has a washer 82 separate from the moveable arm 42. A first ring 66 is a channel ring as is the second ring 40. The second ring 40 is illustrated nesting within the first ring 66 to form the channel 68. Both the first and the second ring 66,40 have lips 70,72,74,76 which assist in defining the channel 68 in this embodiment.

Referring back to FIG. 2, when the boss assembly 10 is applied to the dome 12, the moveable arm 20 is screwed about the shaft 18 to seal the dome between the gripping surfaces 14, 26 until the desired compression is applied to the springs 44,46. It is expected that the deflection of the springs 44,46 and/or the forces experienced by the springs 44,46 will differ. In the preferred embodiment, the expected deflection and the spring moduli are selected so that the O-rings 78,80 will be substantially equally compressed to form a substantially low leakage seal.

The rings 28,38,66,40 may be made of a metal, thermoplastic or other appropriate material. Additionally, the springs 44,46 may be made of an appropriate spring material including metal, polymer or other appropriate material.

The rings 28,38,66,40 are preferably substantially circular and the springs 44,46 are located along the radius portions of the rings 28,38,66,40 in order to apply a specific load at a specific radian relative to the respective ring 28,38,66,40. The springs 44,46 are also preferably substantially circular.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A variable pressure washer comprising:
    first and second rings separated by a channel, each of said first and second rings having an inner and an outer radius; and
    first and second variable stiffness, deformable members located in the channel between the first and second rings, said first member having a lower spring moduli than the second member.

2. The washer of claim 1 further comprising a captive fastener interlocking the first and second rings.

3. The washer of claim 2 wherein the captive fastener further comprises a plunger connected to the first ring and a plunger housing connected to the second ring.

4. The washer of claim 1 further comprising a first spring retaining member within the channel locating the first spring in a first radial position.

5. The washer of claim 4 further comprising a second spring retaining member within the channel locating the second spring in a second radial position.

6. The washer of claim 1 wherein at least one of the first and second member is a metallic spring.

7. The washer of claim 1 wherein at least one of the first and second member is a polymer spring.

8. The washer of claim 1 wherein the first ring is a first channel ring.

9. The washer of claim 8 wherein the second ring is a second channel ring, and the first ring fits within the second ring and creates a channel therebetween.

10. The washer of claim 1 further comprising first and second lips extending from the first ring toward the second ring, said first lip located along the inner radius and the second lip located along the outer radius of the first ring.

11. The washer of claim 1 further comprising a first lip extending from the first ring toward the second ring, said first lip located along the outer radius of the first ring.

12. A washer adapted to transfer a uniform load from a first surface to a linearly varying load on a second surface, said washer comprising:
    first and second rings separated by a channel, said first and second rings having an inner and an outer radius; and
    first and second springs located in the channel, said second spring having a greater spring stiffness than the first spring, said first spring located closer to the inner radius of the first ring than the second ring.

13. The washer of claim 12 wherein the first and second springs extend along radians relative to the first and second washers.

14. The washer of claim 13 wherein the first and second springs are substantially circular.

15. The washer of claim 12 further comprising a first retaining member connected to the first ring, said first retaining member locating the first spring radially relative to the first ring.

16. The washer of claim 15 further comprising a second retaining member connected to the first ring, said second retaining member locating the second spring radially relative to the first ring.

17. The washer of claim 15 further comprising a third retaining member connected to the second ring, said third retaining member locating the first spring radially relative to the second ring.

18. A polar boss assembly comprising a first clamping surface connected to a shaft;
    a movable clamping surface operably connected to the shaft for movement towards and away from the first clamping surface; and
    a variable pressure washer comprising first and second rings separated by a channel, said first and second rings having an inner and an outer radius; and
    first and second springs located in the channel, said first spring having a greater spring modulus than the second spring.

19. The polar boss assembly of claim 18 further comprising two O-rings connected to the first clamping surface.

* * * * *